(12) United States Patent
Huffman

(10) Patent No.: US 11,747,606 B2
(45) Date of Patent: Sep. 5, 2023

(54) SIGHT GLASS

(71) Applicant: Mueller International, LLC, Atlanta, GA (US)

(72) Inventor: Jeffrey Allen Huffman, Monticello, IL (US)

(73) Assignee: Mueller International, LLC, Atlanta, GA (US)

(*) Notice: Subject to any disclaimer, the term of this patent is extended or adjusted under 35 U.S.C. 154(b) by 246 days.

(21) Appl. No.: 17/332,650

(22) Filed: May 27, 2021

(65) Prior Publication Data

US 2021/0286162 A1 Sep. 16, 2021

Related U.S. Application Data

(63) Continuation of application No. 16/038,889, filed on Jul. 18, 2018, now Pat. No. 11,048,074.

(51) Int. Cl.
*G02B 23/24* (2006.01)
*F16L 55/00* (2006.01)
*G02B 7/00* (2021.01)

(52) U.S. Cl.
CPC .......... *G02B 23/2476* (2013.01); *F16L 55/00* (2013.01); *G02B 7/007* (2013.01)

(58) Field of Classification Search
CPC ..... G02B 23/24; G02B 23/2476; F16L 55/00; F16L 41/008; F16L 15/00; F16L 15/002; F16L 15/003; F16L 15/006; F16L 15/007; F16L 15/008; F16L 17/00; F16L 17/02; F16L 17/025; F16L 17/06; A61B 1/00; A61B 1/00064; A61B 1/00066; A61B 1/00071; A61B 1/0055; A61B 1/00073; A61B 1/00078; A61B 1/00096;
(Continued)

(56) References Cited

U.S. PATENT DOCUMENTS 4,807,474 A * 2/1989 Foster ...................... B01J 3/004
116/276
5,210,658 A 5/1993 Foster
(Continued)

OTHER PUBLICATIONS

Huffman, Jeffrey Alan; Non-Final Office Action for U.S. Appl. No. 16/038,889, filed Jul. 18, 2018, dated Nov. 10, 2020, 38 pgs.
(Continued)

*Primary Examiner* — Stephone B Allen
*Assistant Examiner* — Jyotsna V Dabbi
(74) *Attorney, Agent, or Firm* — Taylor English Duma LLP

(57) ABSTRACT

A sight glass assembly can comprise a housing defining an inner housing surface, an outer housing surface, a first housing end, and an opposed second housing end, the inner housing surface defining a housing bore; an adapter defining an inner adapter surface, an outer adapter surface, a first adapter end coupled to the housing, and an opposed second adapter end, the inner adapter surface defining an adapter bore, the outer adapter surface defining a central portion disposed between the first adapter end and the second adapter end, the central portion defining a shoulder contacting the second housing end of the housing; and a transparent viewport positioned in the housing bore such that the interior of a pipe fitting is viewable through the housing bore, the transparent viewport, and the adapter bore.

18 Claims, 10 Drawing Sheets

(58) Field of Classification Search
CPC ............ A61B 1/00105; A61B 1/00112; A61B 1/00119; A61B 1/00121; A61B 1/00128; A61B 1/00131; A61B 1/00137; A61B 1/00147; A61B 1/012
USPC .......................................................... 359/896
See application file for complete search history.

(56) References Cited

U.S. PATENT DOCUMENTS

| | | |
|---|---|---|
| 9,417,161 B2 | 8/2016 | Aljohani |
| 9,632,072 B1 | 4/2017 | Fitch et al. |
| 11,048,074 B2 | 6/2021 | Huffman |
| 2014/0174300 A1 | 6/2014 | Husband et al. |
| 2018/0156372 A1* | 6/2018 | Serum .................. F16L 15/006 |
| 2018/0372256 A1* | 12/2018 | Winborn ................. F16L 41/06 |
| 2019/0145654 A1* | 5/2019 | Bryant .................... F16L 55/24 |
| | | 138/96 R |
| 2020/0026061 A1 | 1/2020 | Huffman |
| 2020/0049259 A1* | 2/2020 | Yokoyama .......... F16K 27/0218 |

OTHER PUBLICATIONS

Huffman, Jeffrey Allen; Notice of Allowance for U.S. Appl. No. 16/038,889, filed Jul. 18, 2018, dated Mar. 3, 2021, 11 pgs.
Huffman, Jeffrey Allen; Requirement for Restriction/Election for U.S. Appl. No. 16/038,889, filed Jul. 18, 2018, dated Jul. 21, 2020, 7 pgs.
Mueller CO; page entitled: "Mueller® H-17619 Inspection Flange Replacement Parts", publicly available prior to Jul. 18, 2018, 1 pg.

* cited by examiner

SIGHT GLASS

CROSS-REFERENCE TO RELATED APPLICATIONS

The present application is a continuation of U.S. application Ser. No. 16/038,889, filed Jul. 18, 2018, which is hereby specifically incorporated by reference herein in its entirety.

TECHNICAL FIELD

Field of Use

This disclosure relates to sight glasses. More specifically, this disclosure relates to sight glass assemblies that permit viewing of an interior of a pipe fitting.

Related Art

When issues arise in a pipeline, such as a gas line and the like, it can be helpful to see inside the pipeline. A sight glass can be coupled to the pipeline, such as at a fitting mounted on the pipeline to allow a user to see the interior of the pipeline. Conventional sight glasses have small viewing areas and can be difficult to attach to the fitting. For example, a different sized sight glass can be required for different sized fittings. Conventional sight glasses can be mounted with flanges and are not customizable for the size of the bore of the fitting. Further, conventional sight glasses can have a rod assembly positioned to one side of the sight glass, making manipulation of the rod assembly within the fitting difficult to view.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a sight glass assembly to permit viewing into an interior of a pipe fitting, the sight glass assembly comprising a housing defining an inner housing surface, an outer housing surface, a first housing end, and an opposed second housing end, the inner housing surface defining a housing bore extending through the housing from the first housing end to the second housing end, an adapter defining an inner adapter surface, an outer adapter surface, a first adapter end coupled to the housing, and an opposed second adapter end configured to couple to the pipe fitting, the inner adapter surface defining an adapter bore extending through the adapter from the first adapter end to the second adapter end, and a transparent viewport positioned in the housing bore such that the interior of the pipe fitting is viewable through the housing bore, the viewport, and the adapter bore.

Also disclosed is a sight glass assembly configured to permit viewing into an interior of a pipe fitting, the sight glass assembly comprising a tubular housing defining an inner housing surface, an outer housing surface, a first housing end, and an opposed second housing end, the inner housing surface defining a housing bore extending through the housing from the first housing end to the second housing end, a tubular adapter defining an inner adapter surface, an outer adapter surface, a first adapter end coupled to the housing, and an opposed second adapter end configured to be coupled to the pipe fitting, the inner adapter surface defining an adapter bore extending through the adapter from the first adapter end to the second adapter end, a transparent viewport positioned in the housing bore such that the interior of the pipe fitting is viewable through the housing bore, the viewport, and the adapter bore, an annular retaining ring positioned between the viewport and the adapter and configured to securely couple the viewport to the housing, the annular retaining ring defining an inner ring surface, an outer ring surface, a first ring end, and an opposed second ring end, the outer ring surface being threaded from the first ring end to the second ring end and configured to matingly engage threads defined in the inner housing surface of the housing, and a stiffener positioned between the first housing end and the viewport, the stiffener configured to prevent flexing of the viewport due to fluid pressure exerted on the viewport from fluid, such as natural gas or water, in the pipe fitting, the stiffener defining an inner stiffener surface, an outer stiffener surface, a first stiffener end, and an opposed second stiffener end.

Also disclosed is a method of viewing an interior of a pipe fitting, the method comprising providing a sight glass assembly comprising a housing defining an inner housing surface, an outer housing surface, a first housing end, and an opposed second housing end, the inner housing surface defining a housing bore extending through the housing from the first housing end to the second housing end, an adapter defining an inner adapter surface, an outer adapter surface, a first adapter end coupled to the housing, and an opposed second adapter end configured to be coupled to the pipe fitting, the inner adapter surface defining an adapter bore extending through the adapter from the first adapter end to the second adapter end, a transparent viewport positioned in the housing bore, an annular retaining ring positioned between the viewport and the adapter and configured to securely couple the viewport to the housing, the annular retaining ring defining an inner ring surface, an outer ring surface, a first ring end, and an opposed second ring end, the outer ring surface being threaded from the first ring end to the second ring end and configured to matingly engage threads defined in the inner housing surface of the housing, an coupling the second adapter end of the adapter to the pipe fitting, and viewing the interior of the pipe fitting through the housing bore, the viewport, and the adapter bore.

Disclosed is a sight glass assembly comprising a housing defining an inner housing surface, an outer housing surface, a first housing end, and an opposed second housing end, the inner housing surface defining a housing bore; an adapter defining an inner adapter surface, an outer adapter surface, a first adapter end coupled to the housing, and an opposed second adapter end, the inner adapter surface defining an adapter bore, the outer adapter surface defining a central portion disposed between the first adapter end and the second adapter end, the central portion defining a shoulder contacting the second housing end of the housing; and a transparent viewport positioned in the housing bore such that the interior of a pipe fitting is viewable through the housing bore, the transparent viewport, and the adapter bore.

Also disclosed is a method of viewing an interior of a pipe fitting, the method comprising providing a sight glass assembly comprising: a housing defining a first housing end, an opposed second housing end, and a housing bore; an adapter defining an outer adapter surface, a first adapter end coupled to the housing, an opposed second adapter end, and an adapter bore, the outer adapter surface defining a shoulder contacting the second housing end of the housing, the first adapter end disposed in the housing bore; and a transparent viewport positioned in the housing bore such that the interior of a pipe fitting is viewable through the housing bore, the transparent viewport, and the adapter bore; coupling the second adapter end of the adapter to the pipe fitting; and viewing the interior of the pipe fitting through the housing bore, the transparent viewport, and the adapter bore Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, and features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
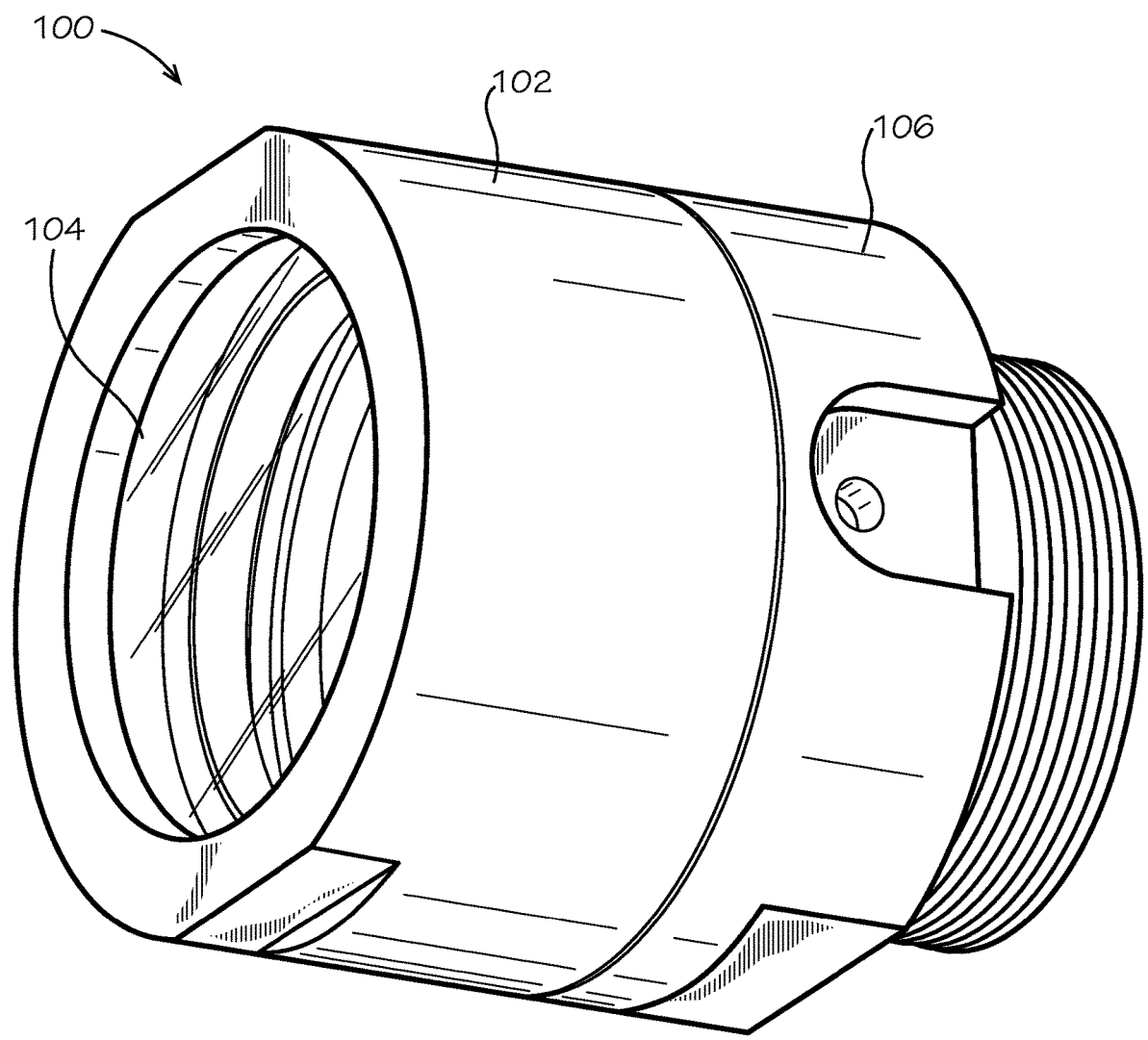
FIG. 1 is a perspective front view of a sight glass assembly comprising a housing, a viewport, and an adapter in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a sight glass and associated methods, systems, devices, and various apparatuses are disclosed herein. It would be understood by one of skill in the art that the disclosed sight glass is described in but a few exemplary aspects among many. No particular terminology or description should be considered limiting on the disclosure or the scope of any claims issuing therefrom.

Figure 2:
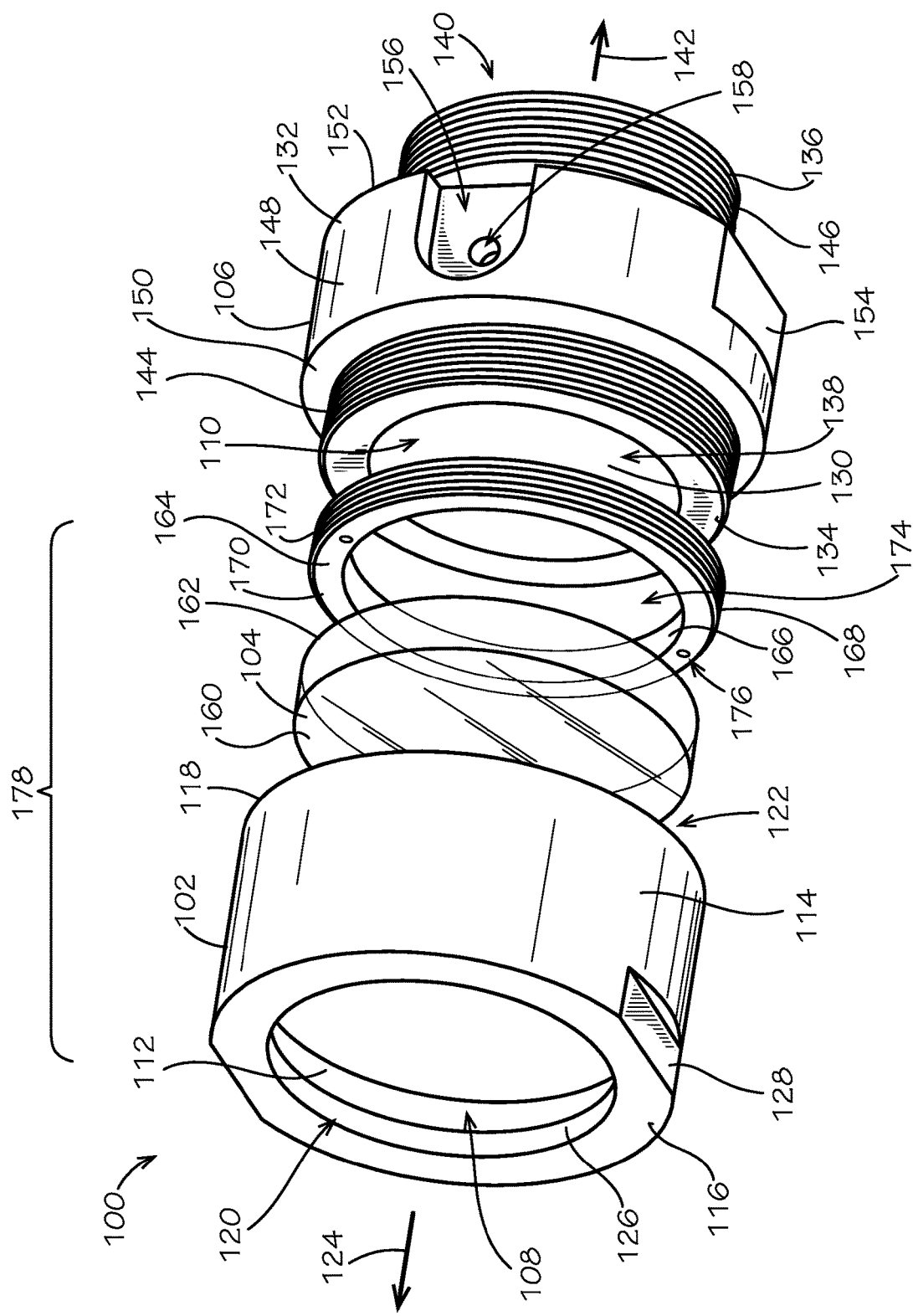
FIG. 2 is an exploded perspective view of the sight glass assembly of FIG. 1.

FIG. 1 shows a perspective view of a sight glass assembly 100 in accordance with one aspect of the present disclosure. The sight glass assembly 100 can comprise a housing 102, a viewport 104, and an adapter 106. With reference to FIG. 2, a housing bore 108 can be defined in the housing 102 and an adapter bore 110 can be defined in the adapter 106. The viewport 104 can be positioned in the housing bore 108 such that, when the housing 102 is coupled to the adapter 106 and the adapter 106 is coupled to a pipe fitting 400, such as a tee, a valve and the like (shown in FIGS. 4 and 5), a user can see through the viewport 104 into the fitting 400.

The housing 102 can define an inner housing surface 112 and an outer housing surface 114. The housing 102 can further define a first housing end 116 and a second housing end 118. The second housing end 118 can be disposed opposite and distal from the first housing end 116. The inner housing surface 112 can define the housing bore 108 extending through the housing 102 from the first housing end 116 to the second housing end 118. The housing bore 108 can define a first housing bore opening 120 at the first housing end 116 and a second housing bore opening 122 at the second housing end 118.

In some aspects, the housing 102 can define a substantially tubular shape, and the housing bore 108 can extend along a housing longitudinal axis 124. More specifically, in some aspects, an inner diameter of the housing bore 108 can be constant from the first housing end 116 to the second housing end 118. In other aspects, the inner diameter of the housing bore 108 can vary from the first housing end 116 to the second housing end 118. For example and without limitation, the inner diameter of the housing bore 108 can be greater between the first housing end 116 and the second housing end 118 compared to the inner diameter at the first housing end 116 or the second housing end 118. In another aspect, an inner diameter of the first housing bore opening 120 and the second housing bore opening 122 can be substantially the same as the inner diameter of the housing bore 108. Alternatively, in other aspects, the inner diameter of at least one of the first housing bore opening 120 and the second housing bore opening 122 can be less than the inner diameter of the housing bore 108. For example, the inner diameter of the first housing bore opening 120 can be less than the inner diameter of the housing bore 108 such that a shoulder 126 can be formed in the housing 102 at the first housing end 116.

At least a portion of the inner housing surface 112 of the housing 102 can be threaded. In one aspect, the inner housing surface 112 can be threaded from the second housing end 118 towards the first housing end 116 a predetermined threaded distance. In another aspect, at least a portion of the inner housing surface 112 can be unthreaded (i.e., smooth). For example, an unthreaded portion of the inner housing surface 112 can extend from the first housing end 116 towards the second housing end 118 a predetermined unthreaded distance. The predetermined unthreaded distance can be greater than or substantially equal to a thickness 105 of the viewport 104, described more fully below.

The outer housing surface 114 of the housing 102 can be substantially cylindrical in shape. In one aspect, at least one flat 128 can be defined in the outer housing surface 114, the at least one flat 128 configured such that a wrench or other tool can grip the outer housing surface 114.

The adapter 106 can define an inner adapter surface 130 and an outer adapter surface 132. The adapter 106 can further define a first adapter end 134 and a second adapter end 136. The second adapter end 136 can be disposed opposite and distal from the first adapter end 134. The inner adapter surface 130 can define the adapter bore 110 extending through the adapter 106 from the first adapter end 134 to the second adapter end 136. The adapter bore 110 can define a first adapter bore opening 138 at the first adapter end 134 and a second adapter bore opening 140 at the second adapter end 136.

In some aspects, the adapter 106 can define a substantially tubular shape, and the adapter bore 110 can extend along an adapter longitudinal axis 142. More specifically, in some aspects, an inner diameter of the adapter bore 110 can be constant from the first adapter end 134 to the second adapter end 136. In other aspects, the inner diameter of the adapter bore 110 can vary from the first adapter end 134 to the second adapter end 136. For example and without limitation, the inner diameter of the adapter bore 110 can be greater between the first adapter end 134 and the second adapter end 136 compared to the inner diameter at the first adapter end 134 or the second adapter end 136. In another aspect, an inner diameter of the first adapter bore opening 138 and the second adapter bore opening 140 can be substantially the same as the inner diameter of the adapter bore 110. Alternatively, in other aspects, the inner diameter of at least one of the first adapter bore opening 138 and the second adapter bore opening 140 can be less than the inner diameter of the adapter bore 110. In yet another aspect, the inner diameter of the adapter bore 110 can be substantially the same as the inner diameter of the housing bore 108. Alternatively, in other aspects, the inner diameter of the adapter bore 110 can be less than or greater than the inner diameter of the housing bore 108.

At least a portion of the inner adapter surface 130 of the adapter 106 can be threaded. Alternatively, the inner adapter surface 130 can be unthreaded (i.e., smooth) in other aspects. At least a portion of the outer adapter surface 132 can be threaded. In one aspect, the outer adapter surface 132 can be threaded to define a first threaded end 144 extending from the first adapter end 134 towards the second adapter end 136 a first predetermined threaded distance. In another aspect, the outer adapter surface 132 can be threaded to define a second threaded end 146 extending from the second adapter end 136 towards the first adapter end 134 a second predetermined threaded distance. In yet another aspect, an unthreaded central portion 148 of the adapter 106 can be defined between the first threaded end 144 and the second threaded end 146. In this aspect, the central portion 148 can comprise a distal end 150 and an opposed proximal end 152.

In one aspect, the first threaded end 144 of the adapter 106 can be sized and shaped to matingly engage the threads defined in the inner housing surface 112 of the housing 102. That is, the first threaded end 144 of the adapter 106 can be configured to be securely coupled to the housing 102 by screwing the housing 102 onto the first threaded end 144 of the adapter 106 such that at least a portion of the first threaded end 144 extends through the second housing bore opening 122 of the housing 102 and into the housing bore 108. With the housing 102 securely coupled to the adapter 106, the second housing end 118 of the housing 102 can be in contact with or adjacent to the distal end 150 of the central portion 148 of the adapter 106.

Figure 4:
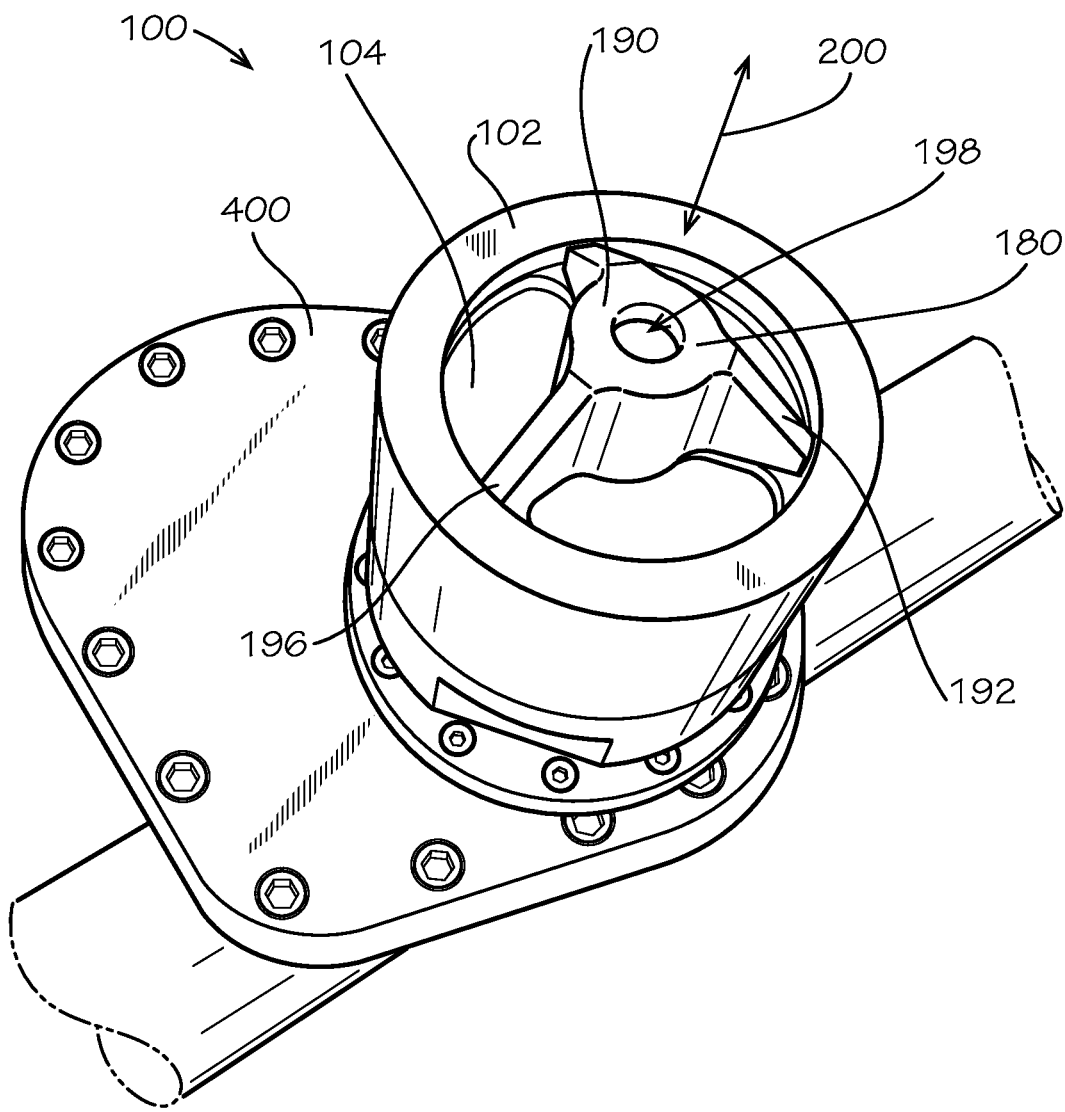
FIG. 4 is a perspective view of the sight glass assembly of FIG. 3 showing the sight glass assembly coupled to a pipe fitting mounted on a pipeline.
Figure 5:
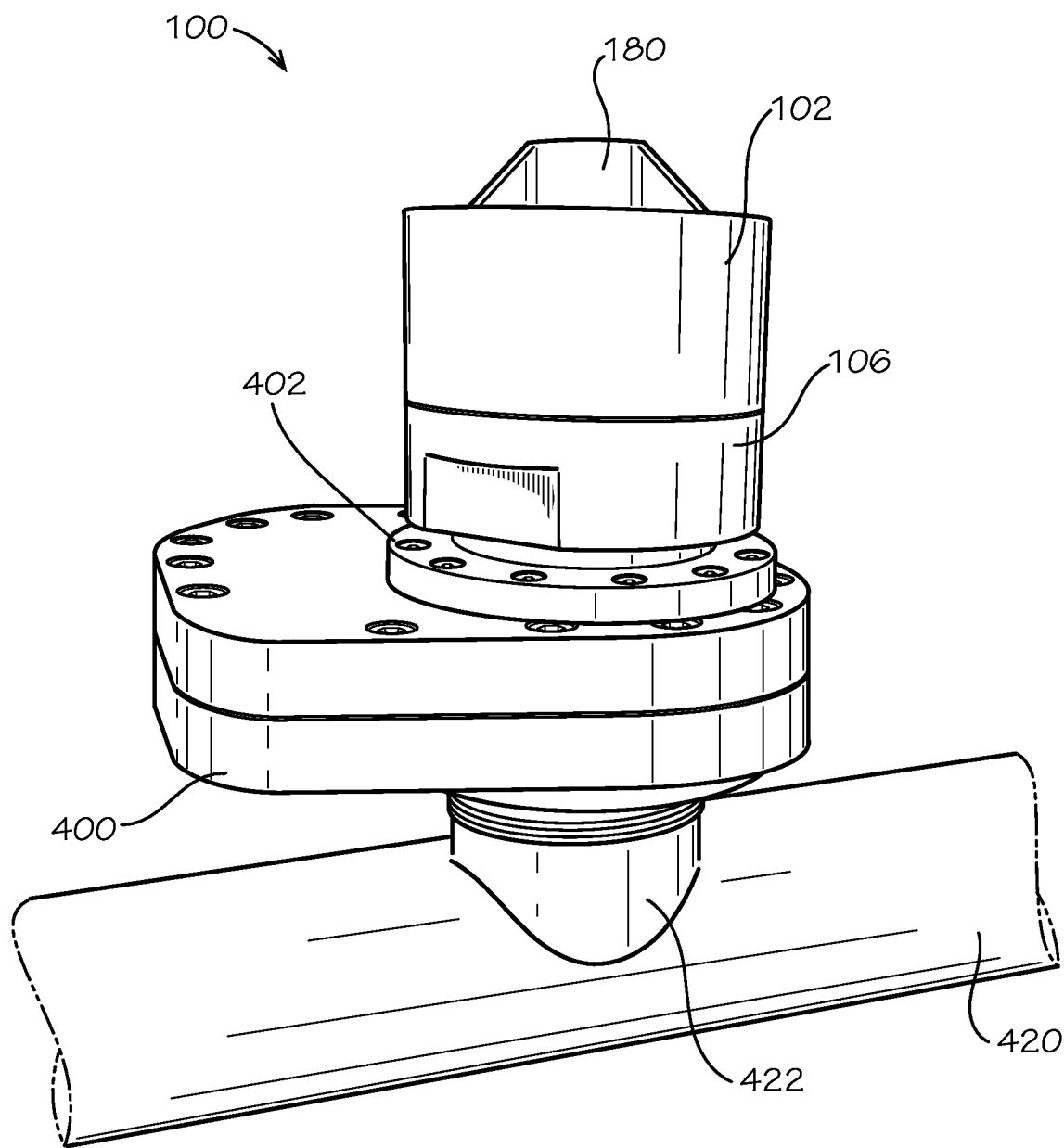
FIG. 5 is a side elevational view of the sight glass assembly and pipe fitting of FIG. 4.
Figure 6:
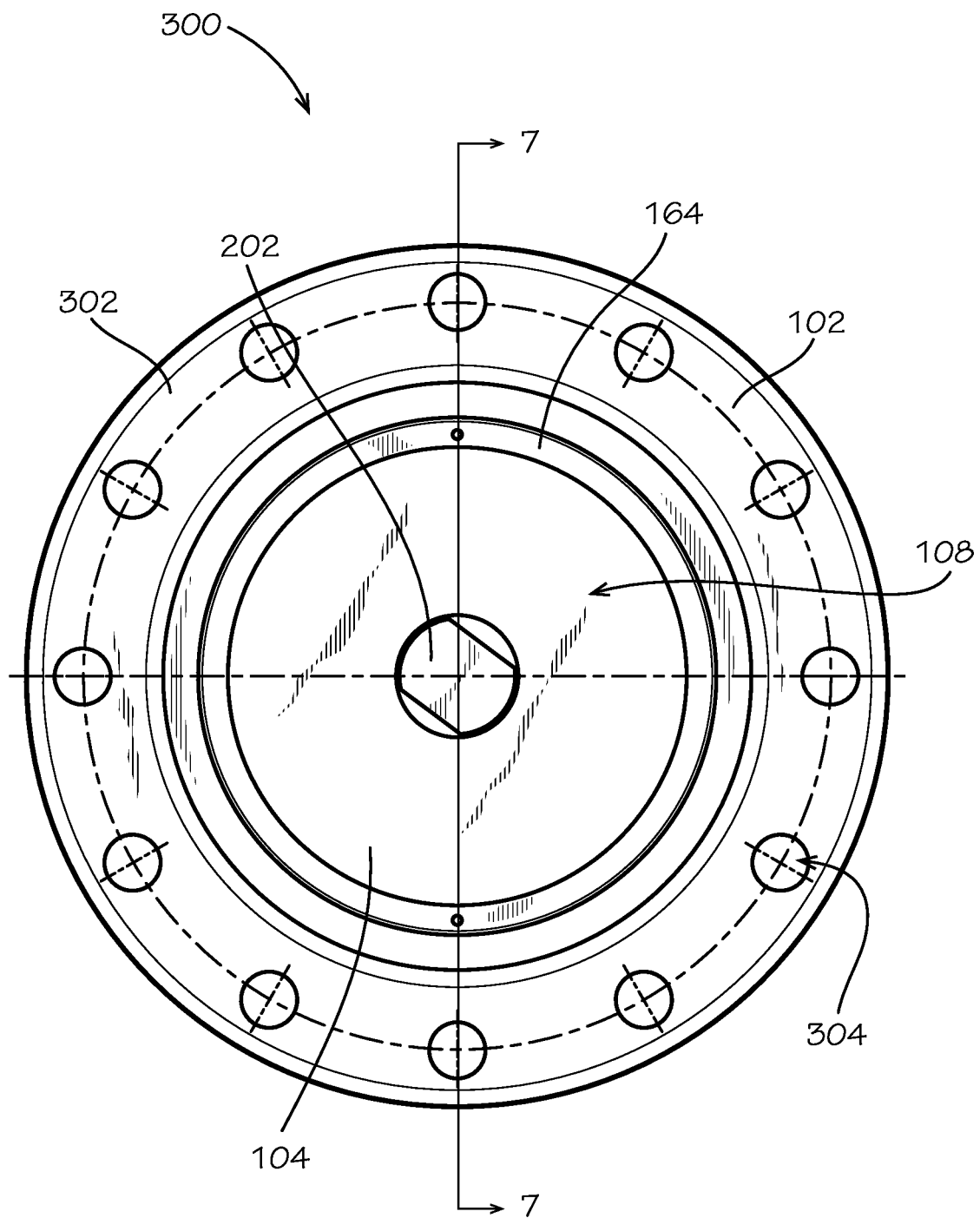
FIG. 6 is a side elevational view of a sight glass assembly comprising a housing, a viewport, and a retaining ring in accordance with another aspect of the current disclosure.

In one aspect, the second threaded end 146 of the adapter 106 can be sized and shaped to matingly engage threads defined in an inner surface (not shown) of a fitting 400 (shown in FIGS. 4 and 5). That is, the second threaded end 146 of the adapter 106 can be configured to be securely coupled to the fitting 400 by screwing the adapter 106 onto the fitting 400 such that at least a portion of the second threaded end 146 extends through a fitting opening (not shown) and into a fitting bore (not shown). With the adapter 106 securely coupled to the fitting 400 (and with the fitting 400 coupled to a pipeline 420 with a tee branch 422), the proximal end 152 of the central portion 148 of the adapter 106 can be in contact with or adjacent to an outer edge 402 of the fitting 400, as shown in FIG. 5. As fittings 400 can vary in shape and size, it is contemplated that a plurality of adapters 106 can be provided, wherein each adapter 106 has a second threaded end 146 sized and shaped to matingly engage a different sized fitting 400.

Referring again to FIGS. 1-3, the outer adapter surface 132 of the adapter 106 can be substantially cylindrical in shape. In one aspect, at least the central portion 148 of the adapter 106 can have an outer diameter substantially equal to an outer diameter of the housing 102. Alternatively, in other aspects, at least the central portion 148 of the adapter 106 can have an outer diameter less than or greater than an outer diameter of the housing 102. In another aspect, at least one flat 154 can be defined in the outer adapter surface 132 of the central portion 148, the at least one flat 154 configured such that a wrench or other tool can grip the outer adapter surface 132. In yet another aspect, a notch 156 can be defined in the outer adapter surface 132 of the central portion 148 of the adapter 106, the notch 156 configured to provide an attachment or mounting point to the adapter 106 for a valve (not shown), such as a pressure relief valve and the like. In this aspect, a channel 158 can extend from the notch 156 into the adapter bore 110 so that the notch 156 can be in fluid communication with the adapter bore 110.

The viewport 104 can be formed from a transparent material such that a user can see from a first side 160 of the viewport to a second side 162 of the viewport 104. In one aspect, the viewport 104 can be formed from, for example and without limitation, a transparent polycarbonate, or other transparent polymeric materials or glass. The viewport 104 can be substantially cylindrical in shape having a diameter slightly less than the inner diameter of the housing bore 108. For example, the diameter of the viewport 104 can be less than the inner diameter of the housing bore 108 and greater than the inner diameter of the first housing bore opening 120 such that the viewport 104 can be positioned in the housing bore 108 of the housing 102 but cannot pass through the first housing bore opening 120. In one aspect, the diameter of the viewport 104 can be about two inches. In other aspects, the diameter of the viewport 104 can be about three, four, five, six, seven, eight, nine, ten, eleven, twelve, or more than about twelve inches.

Figure 3:
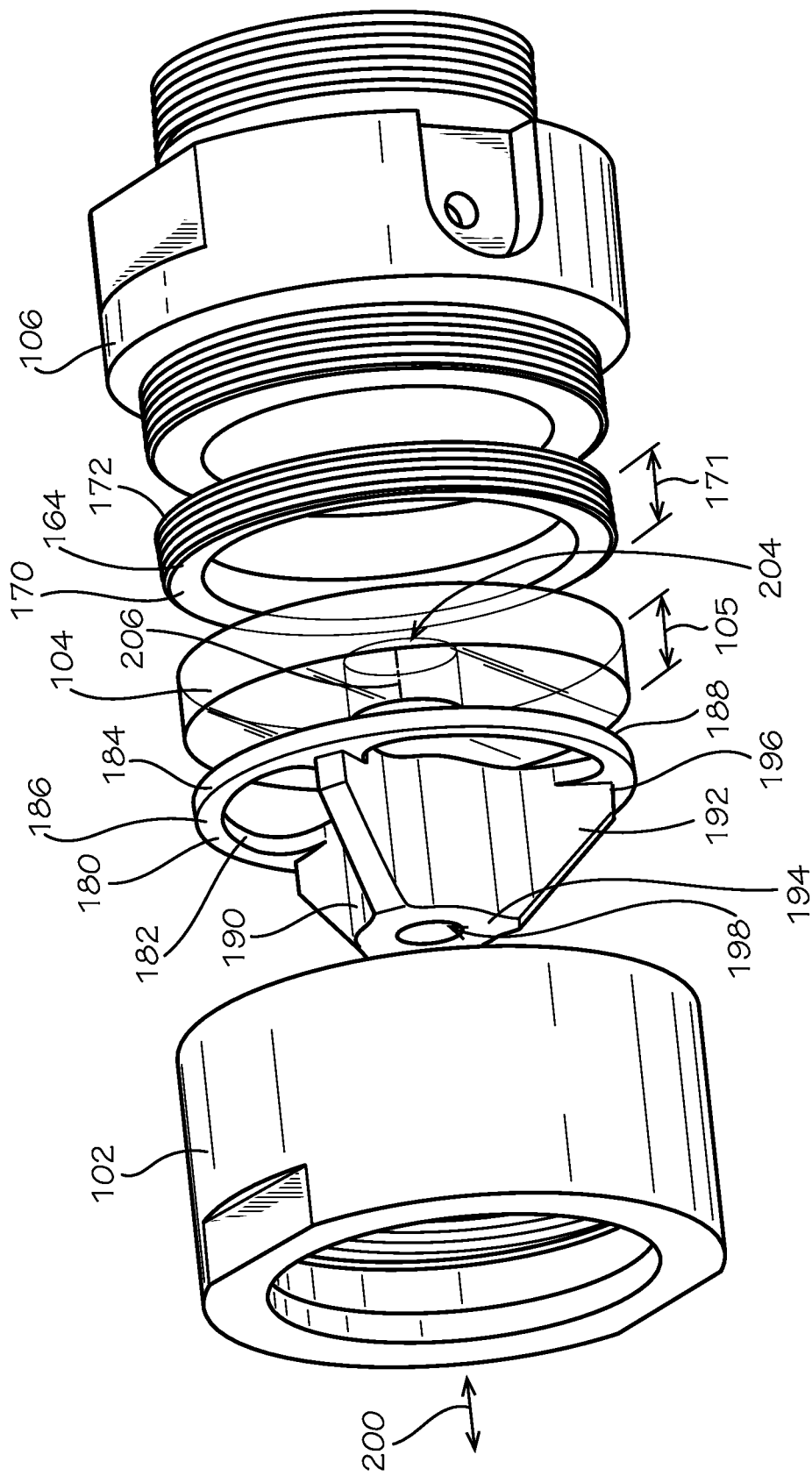
FIG. 3 is an exploded perspective view of another aspect of the sight glass assembly of FIG. 1, in which the sight glass assembly further comprises a stiffener.

In one aspect and as illustrated in FIG. 3, a viewport access bore 204 can be defined in the viewport 104 and can extend along a viewport longitudinal axis 206 from the first side 160 to the second side 162 (shown in FIG. 2) of the viewport 104. More specifically, in some aspects, an inner diameter of the viewport access bore 204 can be constant from the first side 160 to the second side 162 of the viewport 104. In other aspects, the diameter of the viewport access bore 204 can vary from the first side 160 to the second side 162. In another aspect, the viewport access bore 204 can be substantially centered at the geometric center of the viewport 104. That is, the geometric center of the viewport 104 and the geometric center of the viewport access bore 204 can be substantially aligned. Optionally, in other aspects, the viewport access bore 204 can be spaced from the geometric center of the viewport 104 a predetermined distance.

To assemble the sight glass assembly 100 according to one aspect, the viewport 104 can be positioned in the housing bore 108 of the housing 102. A first seal (not shown) such as an O-ring, a gasket and the like can be positioned between the first side 160 of the viewport 104 and the shoulder 126 of the housing 102 so that when the first side 160 of the viewport 104 is urged toward the shoulder 126, a fluid-tight seal can be formed between the viewport 104 and the housing 102. The housing 102 can be threaded onto the first threaded end 144 of the adapter 106 with the viewport 104 positioned between the housing 102 and the adapter 106. A second seal (not shown) such as an O-ring, a gasket and the like can be positioned between the second side 162 of the viewport 104 and the first adapter end 134 so that when the first adapter end 134 is urged toward the second side 162 of the viewport 104, a fluid-tight seal can be formed between the viewport 104 and the adapter 106. In one aspect, the first threaded end 144 of the adapter can extend through the second housing bore opening 122, through a portion of the housing bore 108 and into contact with the viewport 104. The housing 102 can be screwed onto the adapter 106 in this manner until the housing 102 is securely coupled to the adapter 106. In one aspect, with the housing 102 securely coupled to the adapter 106, the second housing end 118 of the housing 102 can be in contact with or adjacent to the distal end 150 of the central portion 148 of the adapter 106. In another aspect, with the housing 102 securely coupled to the adapter 106, the first adapter end 134 can compress the first seal positioned between the housing 102 and the viewport 104 and the second seal positioned between the viewport 104 and the adapter 106 so that a fluid-tight seal is formed between the housing 102, the viewport 104, and the adapter 106.

In use, the sight glass assembly 100 can be coupled to a fitting 400 by screwing the adapter 106 onto the fitting 400 such that at least a portion of the second threaded end 146 extends through a fitting opening and into a fitting bore. A user can then see through the viewport 104 and into the fitting 400. By increasing the diameter of the viewport 104 relative to previous viewports, the ability to see through the viewport 104 can be improved.

In one aspect, the sight glass assembly 100 can further comprise a retaining ring 164, illustrated in FIGS. 2 and 3. The retaining ring 164 can be annular in shape and can define an inner ring surface 166 and an outer ring surface 168. The retaining ring 164 can further define a first ring end 170 and a second ring end 172. The second ring end 172 can be disposed opposite and distal from the first ring end 170. In one aspect, a distance 171 between the first ring end 170 and the second ring end 172 can be less than the predetermined threaded distance of the inner housing surface 112 of the housing 102. In this aspect, with the retaining ring 164 positioned in the housing 102 as described more fully below, the threads of the inner housing surface 112 can extend beyond the retaining ring 164. The inner ring surface 166 can define a ring bore 174 extending through the retaining ring 164 from the first ring end 170 to the second ring end 172.

The inner ring surface 166 of the retaining ring 164 can be smooth and cylindrical as shown. In one aspect, an inner diameter of ring bore 174 can be substantially the same as the inner diameter of the adapter bore 110. Alternatively, in other aspects, the inner diameter of the ring bore 174 can be less than or greater than the inner diameter of the adapter bore 110. In yet another aspect, the inner diameter of the ring bore 174 can be substantially the same as the inner diameter of the housing bore 108. Alternatively, in other aspects, the inner diameter of the ring bore 174 can be less than or greater than the inner diameter of the housing bore 108.

The outer ring surface 168 of the retaining ring 164 can be threaded or unthreaded (i.e., smooth). In one aspect, at least a portion of the outer ring surface 168 can be threaded. For example, the outer ring surface 168 can be threaded from the first ring end 170 to the second ring end 172. In one aspect, the threaded outer ring surface 168 of the retaining ring 164 can be sized and shaped to matingly engage the threads defined in the inner housing surface 112 of the housing 102. That is, the outer ring surface 168 of the retaining ring 164 can be configured to be securely coupled to the housing 102 by screwing the retaining ring 164 onto the threads defined in the inner housing surface 112. For example, the retaining ring 164 can be threaded through the second housing bore opening 122 of the housing 102 and into the housing bore 108. In another aspect, at least a portion of the outer ring surface 168 can be unthreaded. For example, an unthreaded portion of the outer ring surface 168 can extend from the first ring end 170 to the second ring end 172.

In one aspect, a plurality of tool holes 176 can be defined in the first ring end 170 and/or the second ring end 172 of the retaining ring 164. In this aspect, the tool holes can be sized and configured so that a tool, such as a spanner wrench and the like, can be positioned in at least one of the tool holes 176 to rotate the retaining ring 164 relative to the housing 102.

To assemble the sight glass assembly 100 comprising the retaining ring 164, the viewport 104 can be positioned in the housing bore 108 of the housing 102. The first seal (not shown) such as an O-ring, a gasket and the like can be positioned between the first side 160 of the viewport 104 and the shoulder 126 of the housing 102 so that when the first side 160 of the viewport 104 is urged toward the shoulder 126, a fluid-tight seal can be formed between the viewport 104 and the housing 102. The retaining ring 164 can be threaded onto the threads defined in the inner housing surface 112 by rotating the retaining ring 164 with a tool, such as a spanner wrench. In this aspect, the viewport 104 can be positioned between the housing 102 and the retaining ring 164. The second seal (not shown) such as an O-ring, a gasket and the like can be positioned between the second side 162 of the viewport 104 and the first ring end 170 of the retaining ring 164 so that when the retaining ring 164 is urged toward the second side 162 of the viewport 104, a fluid-tight seal can be formed between the viewport 104 and the retaining ring 164. The retaining ring 164 can be screwed into the housing bore 108 in this manner until the retaining ring 164 is securely coupled to the housing 102 to form an end cap 178 comprising the housing 102, the viewport 104 and the retaining ring 164. In one aspect, with the retaining ring 164 securely coupled to the housing 102, the retaining ring 164 can compress the first seal positioned between the housing 102 and the viewport 104, and the second seal positioned between the viewport 104 and the retaining ring 164 so that a fluid-tight seal is formed between the housing 102, the viewport 104 and the retaining ring 164.

The end cap 178 can be threaded onto the first threaded end 144 of the adapter 106 with the viewport 104 and the retaining ring 164 positioned between the housing 102 and the adapter 106. A third seal (not shown) such as an O-ring, a gasket and the like can be positioned between the second ring end 172 of the retaining ring 164 and the first adapter end 134 so that when the first adapter end 134 is urged toward the second ring end 172, a fluid-tight seal can be formed between the retaining ring 164 and the adapter 106.

In one aspect, the first threaded end 144 of the adapter can extend through the second housing bore opening 122, through a portion of the housing bore 108 and into contact with the retaining ring 164. The end cap 178 can be screwed onto the adapter 106 in this manner until the end cap 178 is securely coupled to the adapter 106. In one aspect, with the end cap 178 securely coupled to the adapter 106, the second housing end 118 of the housing 102 can be in contact with or adjacent to the distal end 150 of the central portion 148 of the adapter 106. In another aspect, with the end cap 178 securely coupled to the adapter 106, the first adapter end 134 can compress the third seal positioned between the retaining ring 164 and the adapter 106 so that a fluid-tight seal is formed between the end cap 178 and the adapter 106. In some aspects, the third seal may not be present.

In use, the sight glass assembly 100 can be coupled to a fitting 400 by screwing or bolting the adapter 106 onto the fitting 400 such that at least a portion of the second threaded end 146 extends through the fitting opening and into the fitting bore. A user can then see through the viewport 104 and into the fitting 400. The end cap 178 can be removed from the adapter 106 as an integrated unit, without the viewport 104 falling out of the housing 102, due to the retaining ring 164 holding the viewport 104 inside the housing 102. By increasing the diameter of the viewport 104 relative to previous viewports, the ability to see through the viewport 140 can be improved.

In one aspect, the sight glass assembly 100 can further comprise a stiffener 180 positioned between the housing 102 and the viewport 104 as illustrated in FIG. 3. In this aspect, the stiffener 180 can be formed from a rigid material and configured to prevent or reduce flexing of the viewport 104. The stiffener 180 can be annular in shape and can define an inner stiffener surface 182 and an outer stiffener surface 184. The stiffener 180 can further define a first stiffener end 186 and a second stiffener end 188 disposed opposite and distal from the first stiffener end 186.

The stiffener 180 can comprise a central hub 190 positioned inside the inner stiffener surface 182 and can be coupled to or formed monolithically with the inner stiffener surface 182 by a plurality of stiffener spokes 192 extending from the central hub 190. In one aspect, the central hub 190 can extend away the first stiffener end 186 to a third stiffener end 194 a predetermined distance from the first stiffener end 186. There can be, for example and without limitation, one two, three, or more stiffener spokes 192. In one aspect, the stiffener spokes 192 can be spaced equidistantly relative to each other around the inner stiffener surface 182. Alternatively, at least one stiffener spoke 192 need not be spaced equidistantly relative to another stiffener spoke 192 around the inner stiffener surface 182. In another aspect, the distance between an outer edge 196 of any two stiffener spokes 192 can be less than a diameter of the outer stiffener surface 184.

In one aspect, a stiffener access port 198 can be defined in and extends through the stiffener 180. For example, the stiffener access port 198 can extend along a stiffener longitudinal axis 200 from the third stiffener end 194 to the second stiffener end 188. More specifically, in some aspects, an inner diameter of the stiffener access port 198 can be constant from the third stiffener end 194 to the second stiffener end 188. In other aspects, the inner diameter of the stiffener access port 198 can vary from the third stiffener end 194 to the second stiffener end 188. In another aspect, the stiffener access port 198 can be substantially centered at the geometric center of the central hub 190 and/or the outer stiffener surface 184. That is, the geometric center of the stiffener access port 198 and the geometric center of the outer stiffener surface 184 can be substantially aligned. Optionally, in other aspects, the stiffener access port 198 can be spaced from the geometric center of the central hub 190 and/or the outer stiffener surface 184 a predetermined distance. In another aspect, at least a portion of the stiffener access port 198 can be threaded.

Figure 8:
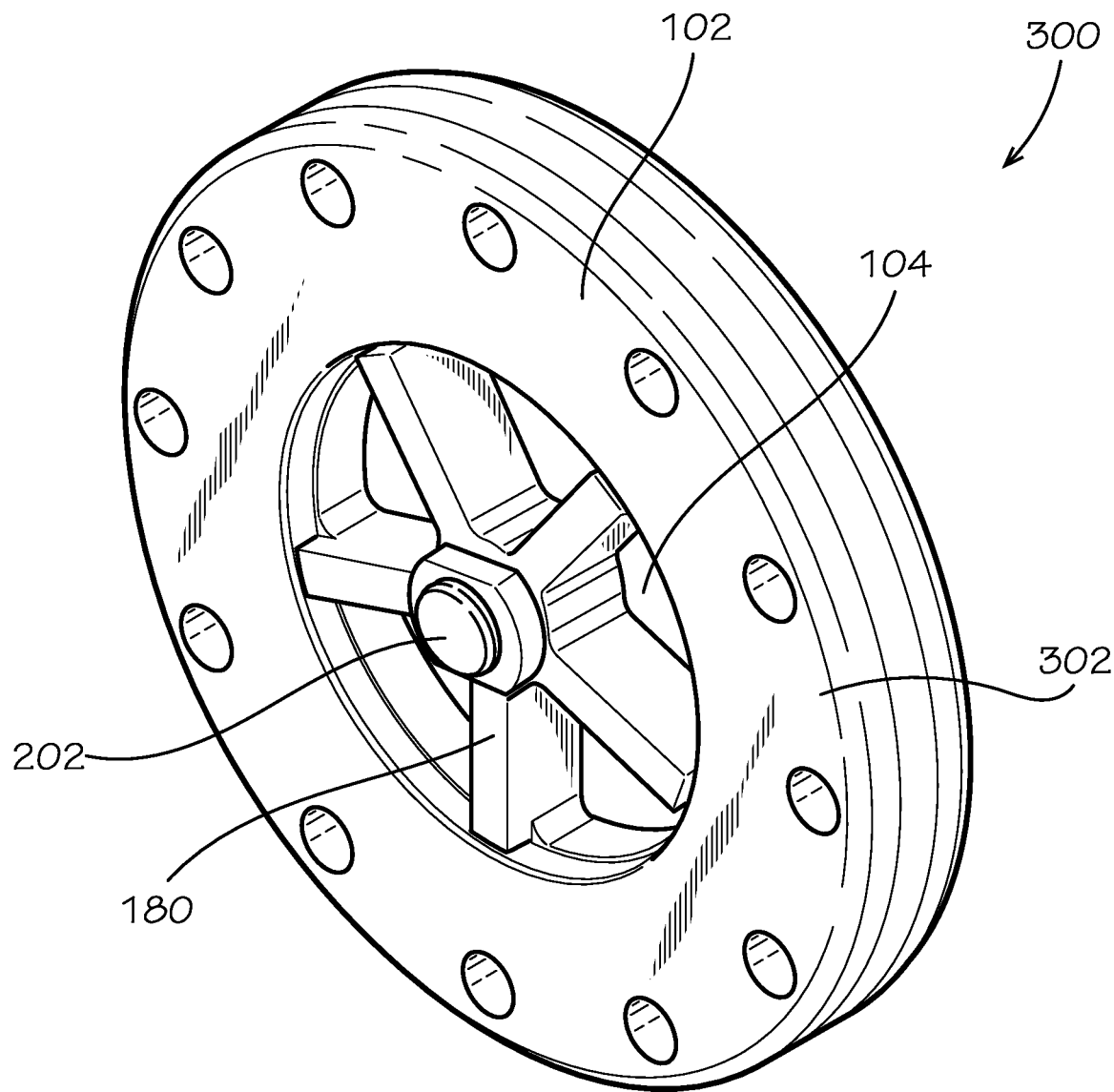
FIG. 8 is a perspective view of the sight glass assembly of FIG. 6.
Figure 9:
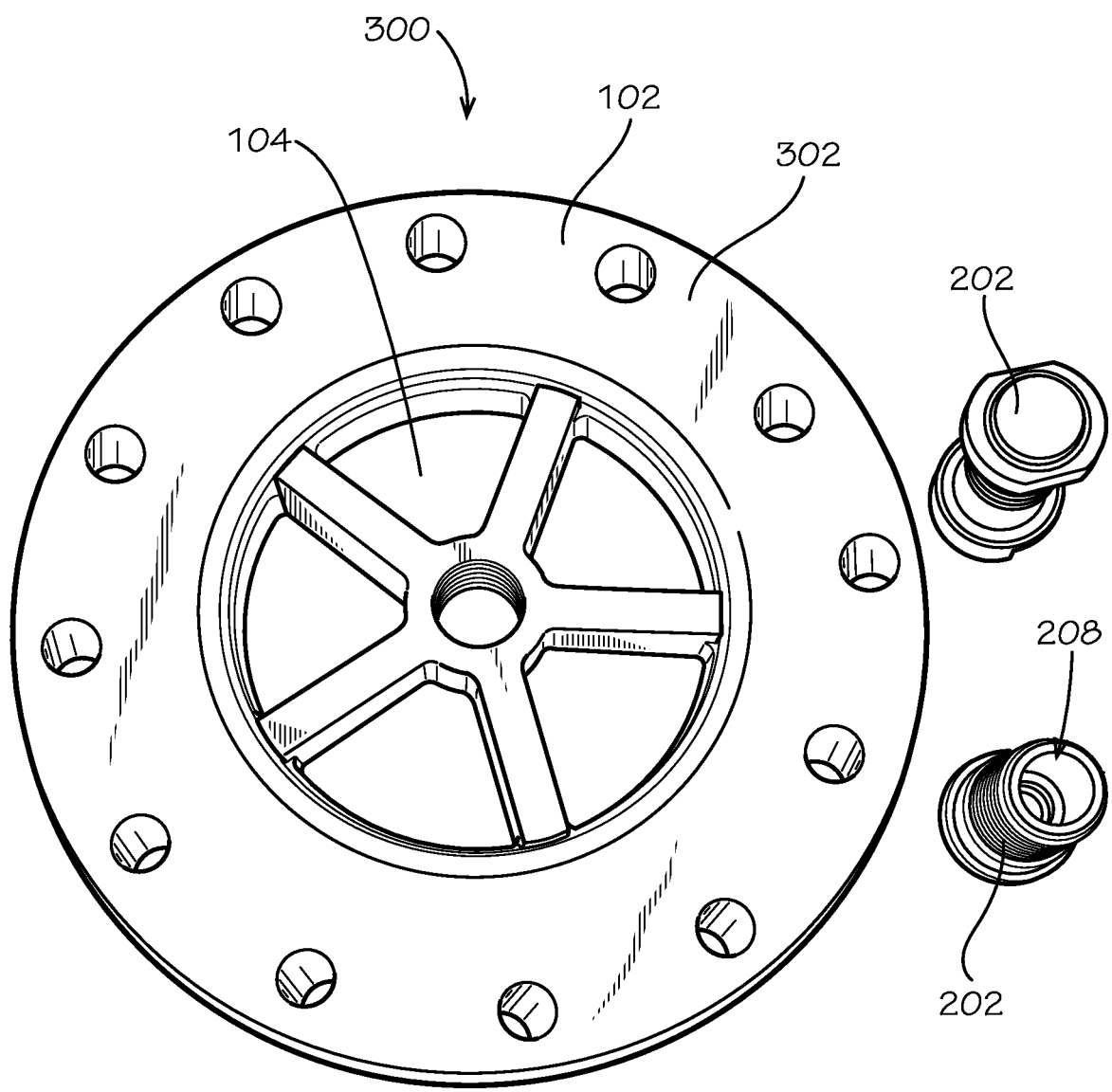
FIG. 9 is another perspective view of the sight glass assembly of FIG. 6.
Figure 10:
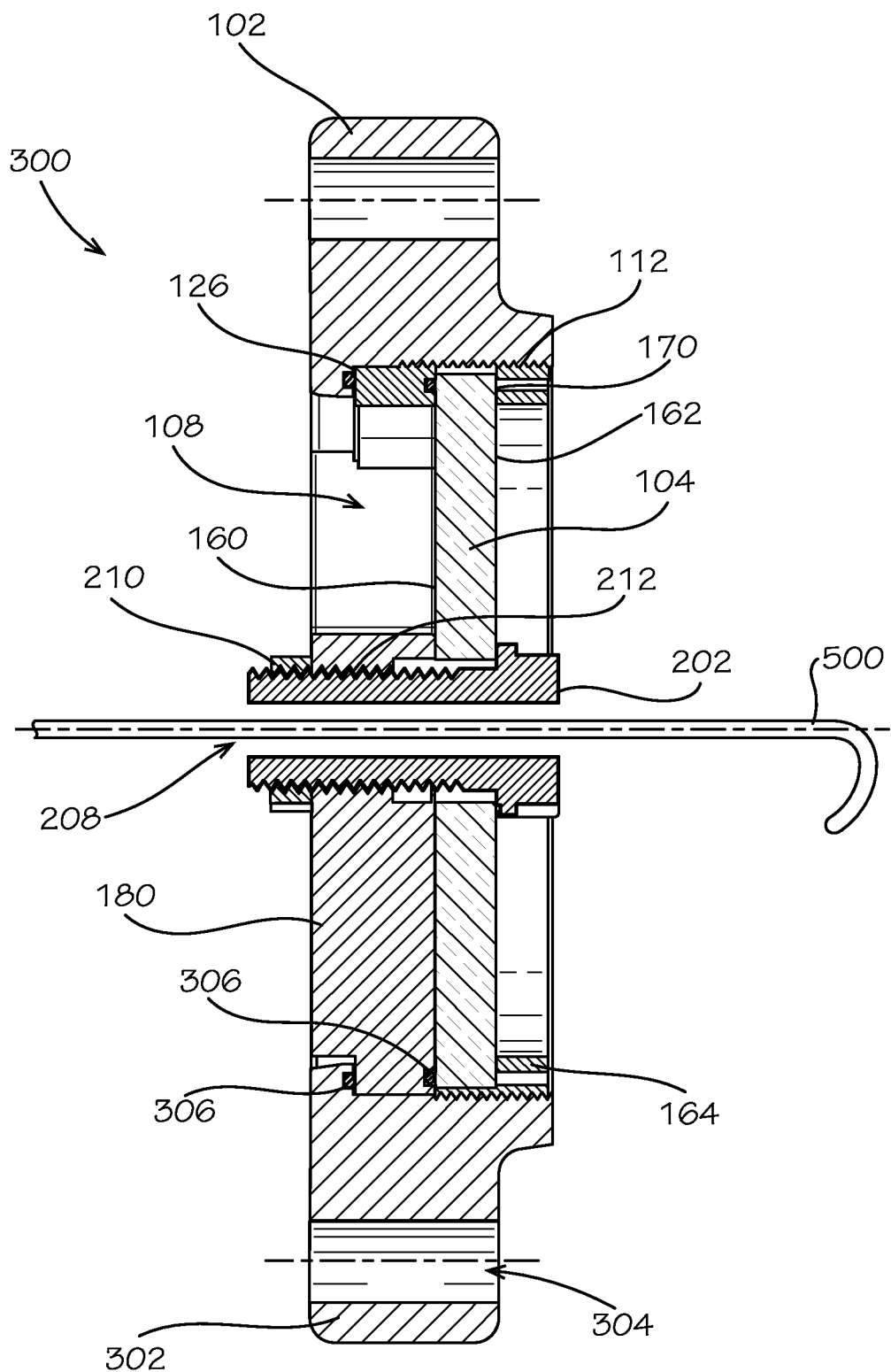
FIG. 10 is a sectional view of the sight glass assembly of FIG. 6 taken along line 7-7 of FIG. 6, showing a tool positioned in an access channel defined in the sight glass assembly according to one aspect of the present disclosure.

The sight glass assembly 100 can further comprise a plug 202 (illustrated in FIGS. 7-9) sized and configured to be positioned in the stiffener access port 198 and/or the viewport access bore 204. In one aspect, the plug 202 can be configured to seal the stiffener access port 198 and/or the viewport access bore 204 of the viewport 104 to prevent fluid from exiting the sight glass assembly 100 through the stiffener access port 198 and/or the viewport access bore 204. In another aspect, the plug 202 can define an access channel 208 (shown in FIG. 9) extending through the plug 202 so that a tool 500 (shown in FIG. 10) can be inserted through the plug 202 and into the fitting 400. In yet another aspect, at least a portion of an outer surface 212 of the plug 202 can be threaded to engage complementary threads defined in the stiffener access port 198 and/or a locknut 210 (shown in FIG. 7).

In one aspect, the tool 500 can be an elongate tool 500 sized and configured to be inserted through the access channel 208 extending through the plug 202. The tool 500 is typically mounted in the plug 202 on a rotatable ball that is sealed with an O-ring to prevent leakage. The O-ring seal can be configured to seal the tool 500 and the plug 202 to prevent fluid from exiting the sight glass assembly 100 between the tool 500 and the plug 202. The tool 500 and plug 202 are thus typically installed in sight glass assembly 100 prior to installation of the sight glass assembly 100 on the fitting 400 and prior to fluid being allowed to flow through the fitting. The tool 500 can be any device capable of being inserted through the access channel 208. For example, the tool 500 can be a hook, brush, magnet and the like as desired to access the interior of the pipe fitting 400 for inspection, cleaning and the like.

To assemble the sight glass assembly 100 comprising the stiffener 180, the stiffener 180 can be positioned in the housing bore 108 of the housing 102 such that at least a portion of the central hub 190 extends through the first housing bore opening 120. For example, the stiffener 180 can be positioned in the housing bore 108 such that the third stiffener end 194 is inserted through the first housing bore opening 120 and the first stiffener end 186 contacts or engages the shoulder 126 of the housing 102. The viewport 104 can be positioned in the housing bore 108 of the housing 102 and the first side 160 of the viewport 104 can be positioned in contact with or adjacent to the second stiffener end 188 of the stiffener 180. Optionally, the retaining ring 164 can be threaded onto the threads defined in the inner housing surface 112 by rotating the retaining ring 164 with a tool, such as a spanner wrench. In this aspect, the viewport 104 can be positioned between the stiffener 180 and the retaining ring 164. The retaining ring 164 can be screwed into the housing bore 108 in this manner until the retaining ring 164 is securely coupled to the housing 102 to form an end cap 178 comprising the housing 102, the stiffener 180, the viewport 104, and the retaining ring 164. In one aspect, with the retaining ring 164 securely coupled to the housing 102, the retaining ring 164 can compress the seals (not shown) positioned between the housing 102, the stiffener 180, the viewport 104, and/or the retaining ring 164.

Figure 7:
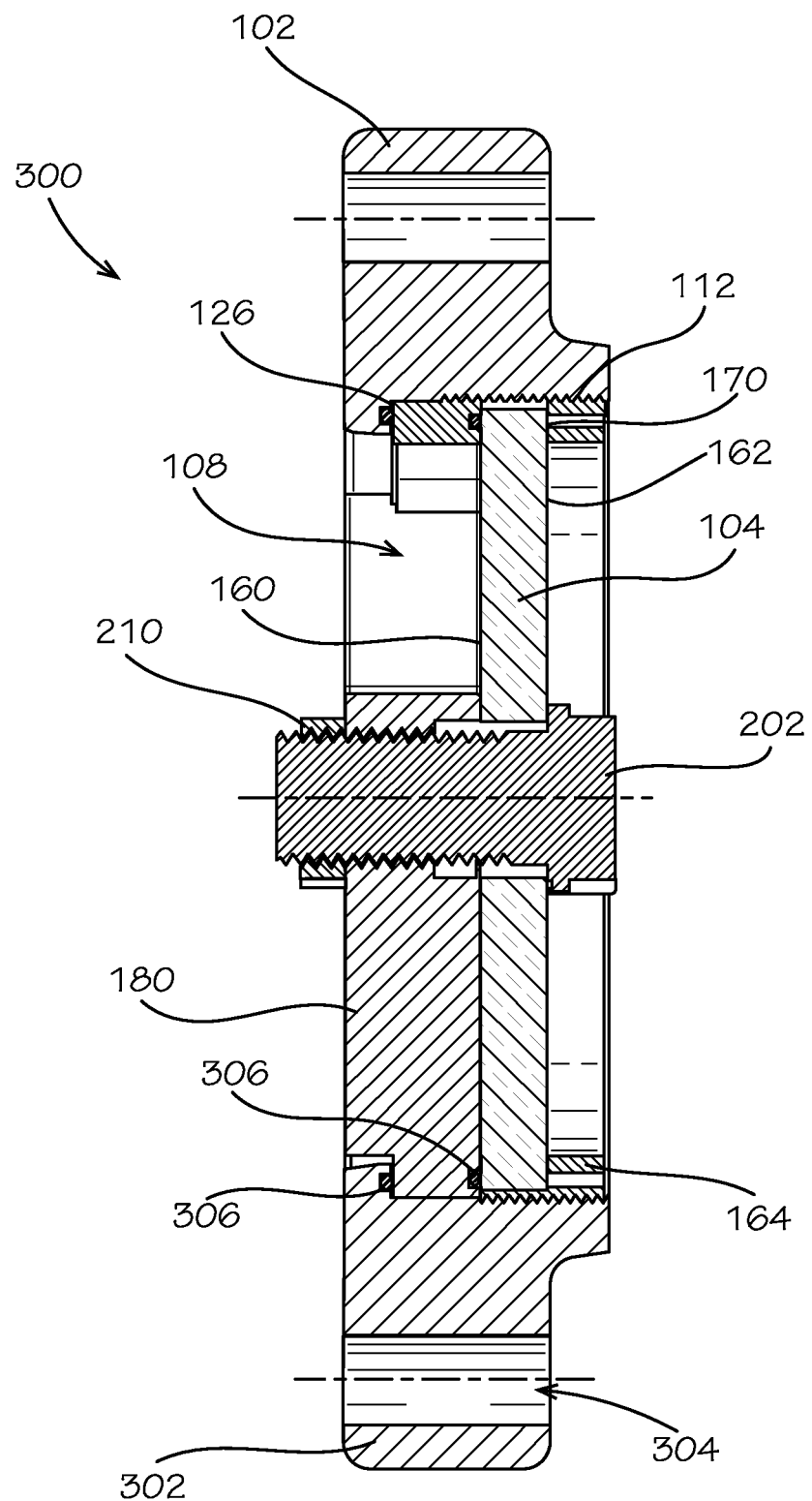
FIG. 7 is a sectional view of the sight glass assembly of FIG. 6 taken along line 7-7 of FIG. 6.

If a viewport access bore 204 is defined in the viewport 104, the plug 202 can be positioned in the stiffener access port 198 and the viewport access bore 204 to prevent fluid from exiting the fitting 400. As illustrated in FIG. 7, a head of the plug 202 can be positioned in contact with or adjacent to the second side 162 of the viewport 104 and a body of the plug 202 can extend through the viewport access bore 204 and at least a portion of the stiffener 180. By positioning the head of the plug 202 adjacent the second side 162 of the viewport 104, fluid pressure exerted onto the plug 202 through the fitting 400 can be transferred from the head of the plug 202 to the viewport 104 and the stiffener 180 rather than threads of the plug 202.

Referring to FIG. 2, the end cap 178 can be threaded onto the first threaded end 144 of the adapter 106. In one aspect, the first threaded end 144 of the adapter 106 can extend through the second housing bore opening 122, through a portion of the housing bore 108 and into contact with the retaining ring 164. The end cap 178 can be screwed onto the adapter 106 in this manner until the end cap 178 is securely coupled to the adapter 106. In one aspect, with the end cap 178 securely coupled to the adapter 106, the second housing end 118 of the housing 102 can be in contact with or adjacent to the distal end 150 of the central portion 148 of the adapter 106. In another aspect, with the end cap 178 securely coupled to the adapter 106, the first adapter end 134 can compress a seal positioned between the retaining ring 164 and the adapter 106 so that a fluid-tight seal is formed between the end cap 178 and the adapter 106.

In use, the sight glass assembly 100 can be coupled to a fitting 400 by screwing or bolting the adapter 106 onto the fitting 400 such that at least a portion of the second threaded end 146 extends through a fitting opening and into the fitting bore. A user can then see through the viewport 104 and into the fitting 400. The end cap 178 can be removed from the adapter 106 as an integrated unit, without the viewport 104 falling out of the housing 102. The plug 202 can be removed to allow access into the fitting 400. In one aspect, if the plug 202 defines an access channel 208, with the sight glass assembly coupled to a fitting 400, a tool 500 (illustrated in FIG. 10) such as a hook, brush, magnet, and the like can be inserted through the access channel 208 and into the fitting 400. By positioning the plug 202 at substantially the geometric center of the viewport 104 and increasing the diameter of the viewport 104 over previous viewports, manipulation of the tool 500 inside the fitting 400 can easily be visible through the viewport 104, which can show all sides of the tool 500. Further, the centering of the tool 500 relative to the viewport 104 allows a light such as a flashlight to be easily used to view the tool 500 through the viewport 104 while simultaneously looking through the viewport 104.

With reference now to FIGS. 6-9, a sight glass assembly 300 in accordance with one aspect of the present disclosure is provided. The sight glass assembly 300 can comprise the housing 102, the viewport 104, and the retaining ring 164 as previously described. In this aspect, however, the housing 102 can comprise a flange 302 that is configured to couple directly to the fitting 400, such as a gate valve and the like, or to the adapter 106. That is, in this aspect, the sight glass assembly 300 need not comprise an adapter 106 because the housing 102 can be coupled directly to the fitting 400. In another aspect, the sight glass assembly 300 can further comprise the stiffener 180 as previously described. Optionally, however the sight glass assembly 300 need not comprise the stiffener 180.

To assemble the sight glass assembly 300 of FIGS. 6-9, the viewport 104 can be positioned in the housing bore 108 of the housing 102. The retaining ring 164 can be threaded onto the threads defined in the inner housing surface 112 by rotating the retaining ring 164 with a tool, such as a spanner wrench, with the viewport 104 positioned between the housing 102 and the retaining ring 164. The retaining ring 164 can be screwed into the housing bore 108 in this manner until the retaining ring 164 is securely coupled to the housing 102 to form the sight glass assembly 300. In one aspect, with the retaining ring 164 securely coupled to the housing 102, the retaining ring 164 can compress the seal positioned between the housing 102 and the viewport 104, and the seal positioned between the viewport 104 and the retaining ring 164 so that a fluid-tight seal is formed between the housing 102, the viewport 104, and the retaining ring 164. In one aspect, with the retaining ring 164 securely coupled to the housing 102, the retaining ring 164 can compress seals 306 positioned between the housing 102, the viewport 104, and/or the retaining ring 164.

If the sight glass assembly 330 comprises the stiffener 180, the stiffener 180 can be positioned in the housing bore 108 of the housing 102 so that the stiffener 180 is positioned between the shoulder 126 of the housing 102 and the first side 160 of the viewport 104. The retaining ring 164 can be threaded onto the threads defined in the inner housing surface 112 with the viewport 104 positioned between the stiffener 180 and the retaining ring 164. Seals 306 can be positioned between the housing 102, the stiffener 180, the viewport 104, and/or the retaining ring 164 to prevent the sight glass assembly 300 from leaking fluid.

The sight glass assembly 300 can be positioned over the opening in the fitting 400, and bolted directly to the fitting 400 by aligning bolt holes 304 of the flange 302 of the housing 102 with bolt holes (not shown) of the fitting 400. A user can then see through the viewport 104 and into the fitting 400. The sight glass assembly 300 can be removed from the fitting 400 as an integrated unit, without the viewport 104 falling out of the housing 102. The plug 202 can be removed to allow access into the fitting 400. If the plug 202 defines an access channel 208, a tool 500, such as a hook, brush, magnet and the like, can be inserted through the access channel 208 and into the fitting 400. By positioning the plug 202 at substantially the geometric center of the viewport 104, manipulation of the tool 500 inside the fitting 400 can easily be visible through the viewport 104. Further, the centering of the tool 500 relative to the viewport 104 allows a light such as a flashlight to be easily used to view the tool 500 through the viewport 104.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A sight glass assembly to permit viewing into an interior of a pipe fitting, the sight glass assembly comprising:
   a housing defining an inner housing surface, an outer housing surface, a first housing end, and an opposed second housing end, the inner housing surface defining a housing bore;
   an adapter defining an inner adapter surface, an outer adapter surface, a first adapter end coupled to the housing, and an opposed second adapter end, the inner adapter surface defining an adapter bore, the outer adapter surface defining a central portion disposed between the first adapter end and the second adapter end, the central portion defining a shoulder contacting the second housing end of the housing; and
   a transparent viewport positioned in the housing bore such that the interior of a pipe fitting is viewable through the housing bore, the transparent viewport, and the adapter bore;
   wherein:
      the outer adapter surface further defines a notch configured to provide an attachment point to the adapter for a valve;
      the adapter further defines a channel extending from the notch to the adapter bore; and
      the notch is in fluid communication with the adapter bore.

2. The sight glass assembly of claim 1, wherein the adapter further defines a first threaded end extending substantially from the first adapter end to a the central portion, the first threaded end configured to engage a threaded portion of housing.

3. The sight glass assembly of claim 2, wherein the outer adapter surface defines the first threaded end of the adapter, and the inner housing surface defines the threaded portion of the housing extending from the second housing end toward the first housing end.

4. The sight glass assembly of claim 2, wherein the shoulder extends radially inward to the first threaded end at a distal end of the central portion.

5. The sight glass assembly of claim 2, wherein the adapter further defines a second threaded end extending substantially from the second adapter end to the central portion and configured to threadably engage the pipe fitting.

6. The sight glass assembly of claim 5, wherein the central portion defines a second shoulder extending radially inward to the second threaded end at a proximal end of the central portion.

7. The sight glass assembly of claim 1, wherein the outer adapter surface further defines a substantially planar flat.

8. The sight glass assembly of claim 7, wherein the substantially planar flat is defined in the central portion.

9. The sight glass assembly of claim 8, wherein:
the central portion defines a proximal end and a distal end;
the shoulder is defined at the distal end; and
the substantially planar flat extends from the proximal end of the central portion toward the distal end of the central portion, the substantially planar flat terminating before the distal end.

10. The sight glass assembly of claim 1, wherein the notch is defined in the central portion.

11. The sight glass assembly of claim 10, wherein:
the central portion defines a proximal end and a distal end;
the shoulder is defined at the distal end; and
the notch extends from the proximal end of the central portion toward distal end of the central portion.

12. The sight glass assembly of claim 1, wherein the housing bore defines a first housing bore opening at the first housing end and a second housing bore opening at the second housing end, and wherein an inner diameter of the first housing bore opening is less than an inner diameter of the housing bore such that a housing shoulder is formed at the first housing end, the transparent viewport oriented between the housing shoulder and the first adapter end of the adapter.

13. The sight glass assembly of claim 1, wherein the outer housing surface further defines a substantially planar flat extending from the first housing end towards the second housing end.

14. A method of viewing an interior of a pipe fitting, the method comprising:
providing a sight glass assembly comprising:
a housing defining a first housing end, an opposed second housing end, and a housing bore;
an adapter defining an outer adapter surface, a first adapter end coupled to the housing, an opposed second adapter end, and an adapter bore, the outer adapter surface defining a shoulder contacting the second housing end of the housing, the first adapter end disposed in the housing bore; and
a transparent viewport positioned in the housing bore such that the interior of a pipe fitting is viewable through the housing bore, the transparent viewport, and the adapter bore;
coupling the second adapter end of the adapter to the pipe fitting; and
viewing the interior of the pipe fitting through the housing bore, the transparent viewport, and the adapter bore;
wherein:
the outer adapter surface further defines a notch configured to provide an attachment point to the adapter for a valve;
the adapter further defines a channel extending from the notch to the adapter bore; and
the notch is in fluid communication with the adapter bore.

15. The method of claim 14, wherein the outer adapter surface defines a first threaded end extending from the first adapter end towards the second adapter end, the first threaded end engaging a threaded portion of the housing, the threaded portion of the housing disposed in the housing bore.

16. The method of claim 15, wherein the outer adapter surface defines a second threaded end extending from the second adapter end towards the first adapter end, and wherein coupling the second adapter end of the adapter to the pipe fitting comprises engaging the second threaded end with an internal threaded portion of the pipe fitting and rotating the sight glass assembly relative to the pipe fitting.

17. The method of claim 16, wherein the outer adapter surface defines a central portion between the first threaded end and the second threaded end, the central portion being unthreaded, the central portion defining the shoulder extending radially inward to the first threaded end at a distal end of the central portion.

18. The method of claim 16, wherein the adapter defines a substantially planar flat, and wherein coupling the second adapter end of the adapter to the pipe fitting comprises engaging the substantially planar flat with a tool and rotating the sight glass assembly relative to the pipe fitting with the tool.

* * * * *